Figure 1:
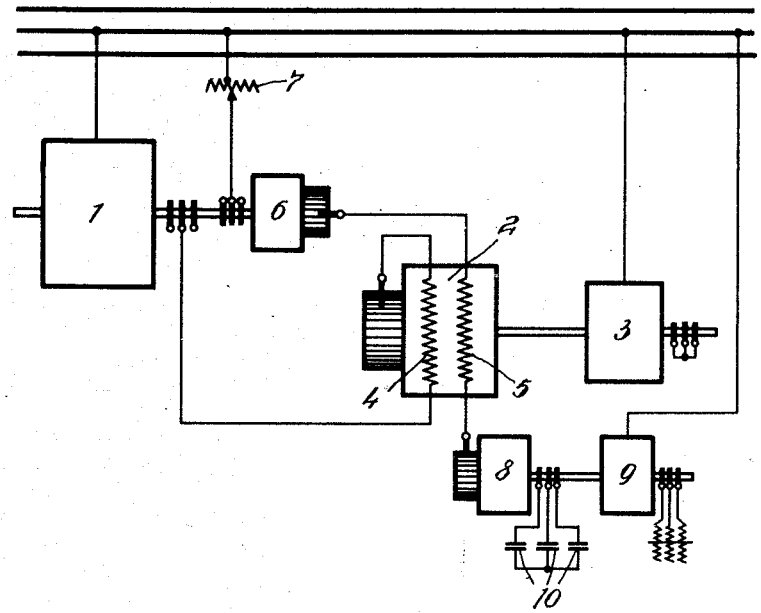

Inventors
Johann Ossanna,
Hans Braner, +
Fritz Hofmann
by Knight Bro
Attorneys

Patented June 14, 1932

1,863,065

UNITED STATES PATENT OFFICE

JOHANN OSSANNA AND HANS GRANER, OF MUNICH, AND FRITZ HOFMANN, OF MUNICH-TALKIRCHEN, GERMANY, ASSIGNORS TO SIEMENS-SCHUCKERTWERKE AKTIENGESELLSCHAFT, OF BERLIN-SIEMENSSTADT, GERMANY, A CORPORATION OF GERMANY

MEANS FOR COMPENSATING THE REACTANCE OF INDUCTIVE WINDINGS

Application filed April 17, 1928, Serial No. 270,656, and in Germany April 25, 1927.

Our invention relates to an arrangement for compensating the wattless resistance of windings with self-induction, which carry alternating currents of variable frequency. More specifically our invention relates to the compensation of the wattless resistance in slip frequency carrying exciter windings of commutator machines, which for the purpose of regulating the speed or compensating the phases are directly or indirectly connected in the secondary circuit of asynchronous machines.

Our invention consists in connecting in the circuit with variable frequency a frequency converter or changer (such as a commutator frequency converter or an asynchronous machine) and connecting to the secondary side of this frequency converter apparatus or devices adapted to take up capacitive current.

Two embodiments of our invention are diagrammatically illustrated in the drawing affixed hereto and forming part of our specification.

Figure 2:
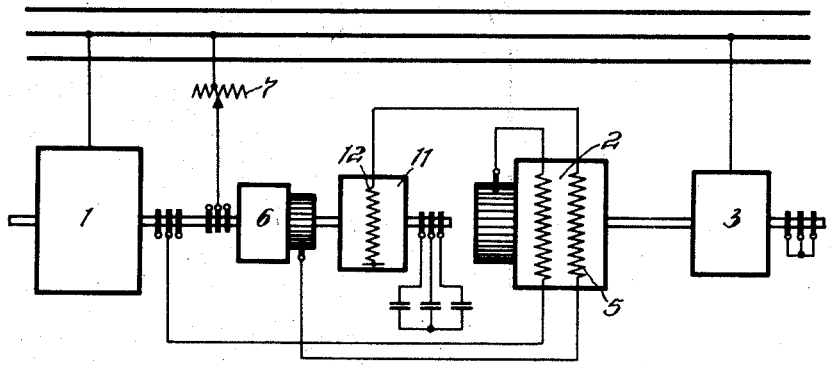

In the drawing:

Fig. 1 represents an arrangement in which a rotary converter is used as auxiliary frequency converter in circuit with the commutator rear machine, and Fig. 2 represents a modification in which an asynchronous machine is used as auxiliary frequency converter.

Referring to Fig. 1 of the drawing, 1 is a three-phase asynchronous motor in the secondary circuit of which is connected a commutator rear machine 2 for the purpose of regulating the speed or compensating the phases of the main machine. This commutator rear machine is coupled with a loading machine 3. It possesses in the stator apart from the compensating winding 4 a slip frequency carrying exciter winding 5. For feeding the exciter winding is provided a frequency converter 6, which is mechanically coupled with the main machine and is fed from the network through a regulating transformer 7. When regulating the current in the winding 5 the difficulty arises that the inductive counter voltage generated by the winding varies greatly with the variation of the slip frequency in this winding, which not only prevents the regulation proportional to the exciter current at the transformer 7, but also causes an inadmissible displacement of the phase of the exciter current in the winding 5. In order to eliminate these drawbacks we provide according to our invention an auxiliary frequency converter 8, connected with its primary side in circuit with winding 5, the rotor of this auxiliary converter being coupled with an auxiliary asynchronous machine 9 connected to the network and which runs with approximately constant speed. To the secondary side of frequency converter 8 are connected the condensers 10. These condensers introduce through the frequency converters a capacitive voltage into the exciter circuit 5 of the commutator rear machine 2, which compensates the inductive voltage drop at the exciter winding 5.

The arrangement according to Fig. 2 is substantially the same as in Fig. 1, except that the auxiliary frequency converter consists hereof an asynchronous machine 11, which is mechanically coupled with the main asynchronous machine 1. The exciter winding 12 in the stator of this auxiliary asynchronous machine is connected in series with the exciter winding 5 of the commutator rear machine. To the secondary part comprising the rotor of the machine 11 are connected condensers 10 similar to the arrangement of auxiliary converter 8 in Fig. 1. The wiring is such, that at the slip rings of the machine 11 a voltage of network frequency is induced.

Various modifications and changes may be made without departing from the spirit and scope of the invention, and we desire, therefore, that only such limitations shall be placed thereon as are imposed by the prior art.

We claim as our invention:—

1. In combination, a main asynchronous machine, a commutator machine having a primary side connected in the secondary circuit of said asynchronous machine, a slip frequency carrying exciter winding in the stator of said commutator machine and constituting the secondary side of said machine, an auxiliary asynchronous machine having a primary and a secondary winding, the primary winding being connected in the exciter circuit of said commutator machine, means for operating the auxiliary asynchronous machine in a direction of rotation by which the frequency of the E. M. F. induced in its secondary winding is higher than the frequency impressed on its primary winding, and a device connected to the secondary winding of said auxiliary asynchronous machine and adapted to introduce a capacitive voltage into the exciter circuit of said commutator machine for compensating the inductive voltage drop of said exciter winding.

2. In combination, a main asynchronous machine, a commutator machine having a primary side connected in the secondary circuit of said asynchronous machine, a slip frequency carrying exciter winding in the stator of said commutator machine and constituting the secondary side of said machine, an auxiliary asynchronous machine having a primary and a secondary winding, the primary winding being connected in the exciter circuit of said commutator machine, means for operating the auxiliary asynchronous machine in a direction of rotation by which the frequency of the E. M. F. induced in its secondary winding is higher than the frequency impressed on its primary winding and a condenser connected to the secondary winding of said auxiliary asynchronous machine and adapted to introduce a capacitive voltage into the exciter circuit of said commutator machine for compensating the inductive voltage drop at said exciter winding.

3. In combination, a main asynchronous machine, a commutator machine having a primary side connected in the secondary circuit of said asynchronous machine, a slip frequency carrying exciter winding in the stator of said commutator machine and constituting the secondary side of said machine, an auxiliary asynchronous machine having a primary and a secondary winding, the primary winding being connected in the exciter circuit of said commutator machine, and condensers connected to the secondary winding of said auxiliary asynchronous machine and adapted to introduce a capacitive voltage into the exciter circuit of said commutator machine for compensating the inductive voltage drop at said exciter winding, said auxiliary asynchronous machine being mechanically coupled with the main asynchronous machine and being driven by said main asynchronous machine in a direction of rotation, by which the frequency of the E. M. F. induced in the secondary winding of the auxiliary machine is higher than the frequency impressed on its primary winding.

4. In an electric circuit, carrying currents of variable frequency, in combination, a self inductive winding in said circuit, an auxiliary frequency-converting machine having a primary and a secondary winding, said primary winding being also connected in the circuit of variable frequency, means for operating said auxiliary machine in the direction of rotation by which the frequency of the E. M. F. induced in its secondary winding is higher than the frequency impressed on its primary winding, a device connected to the secondary winding of said auxiliary machine, said device being adapted to take up capacitive currents.

In testimony whereof we affix our signatures.

JOHANN OSSANNA.
HANS GRANER.
FRITZ HOFMANN.